(12) United States Patent
Bradley

(10) Patent No.: US 9,842,521 B2
(45) Date of Patent: Dec. 12, 2017

(54) ASSEMBLY FOR COMMUNICATING A STATUS OF A VEHICLE

(71) Applicant: Jesse L. Bradley, Salina, KS (US)

(72) Inventor: Jesse L. Bradley, Salina, KS (US)

( * ) Notice: Subject to any disclaimer, the term of this patent is extended or adjusted under 35 U.S.C. 154(b) by 0 days.

(21) Appl. No.: 15/435,541

(22) Filed: Feb. 17, 2017

(65) Prior Publication Data

US 2017/0162086 A1    Jun. 8, 2017

(51) Int. Cl.
*G09F 11/00* (2006.01)
*G09F 11/04* (2006.01)
*G09F 21/04* (2006.01)

(52) U.S. Cl.
CPC .............. *G09F 11/04* (2013.01); *G09F 21/04* (2013.01); *G09F 11/00* (2013.01)

(58) Field of Classification Search
CPC ........... G09F 7/00; G09F 11/23; G09F 11/025
USPC .................................. 40/113–115, 495, 192
See application file for complete search history.

(56) References Cited

U.S. PATENT DOCUMENTS

| | | | | |
|---|---|---|---|---|
| 2,507,794 A | * | 5/1950 | Longnecker | A44B 15/005 40/111 |
| 3,027,073 A | * | 3/1962 | Handelamn | 235/128 |
| 3,259,311 A | * | 7/1966 | Sama | 116/311 |
| 3,468,049 A | * | 9/1969 | Benson | G09D 3/08 40/115 |
| 3,936,957 A | * | 2/1976 | Nordbye | G09B 1/22 40/495 |
| 2004/0244245 A1 | * | 12/2004 | Abdelrahman | G09F 11/04 40/495 |
| 2010/0186273 A1 | * | 7/2010 | Jones | G09F 7/00 40/492 |

* cited by examiner

*Primary Examiner* — Shin Kim
(74) *Attorney, Agent, or Firm* — Kenneth H. Jack; Davis & Jack, L.L.C.

(57) ABSTRACT

An assembly for communicating a status of a vehicle, the assembly incorporating an inner plate; an inner slot plurality positioned at the inner plate's peripheral edge; a plurality of indicia display surfaces having radially inner ends, wherein each indicia display surface is positioned between an adjacent pair of slots; an outer plate having a peripheral edge, the outer plate being rotatably mounted upon the inner plate; an outer slot positioned at the outer plate's peripheral edge, wherein the outer slot is sized for, upon rotation of the outer plate, successively exposing overlying the indicia display surfaces; and a pawl fixedly attached to and extending inwardly from the outer plate, the pawl being positioned for, upon the outer plate rotation, successively engaging the inner slots.

13 Claims, 11 Drawing Sheets

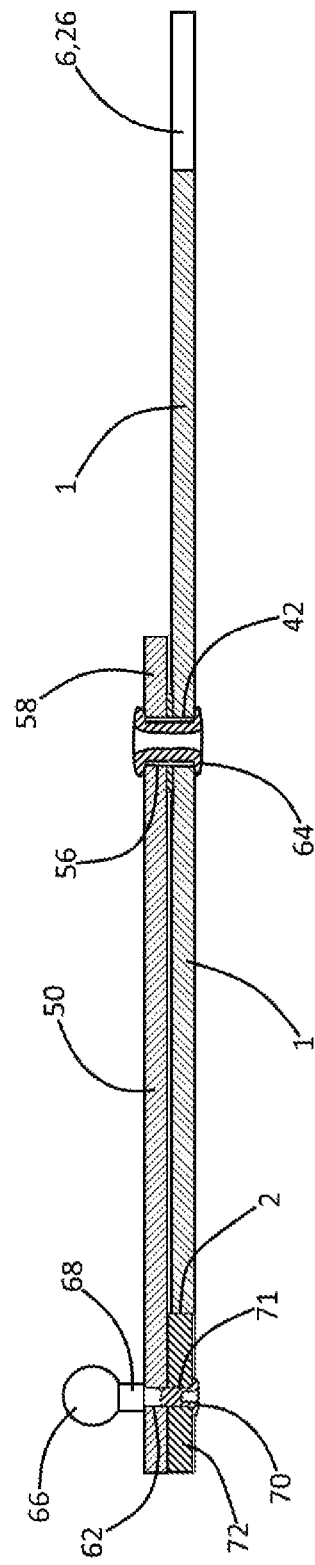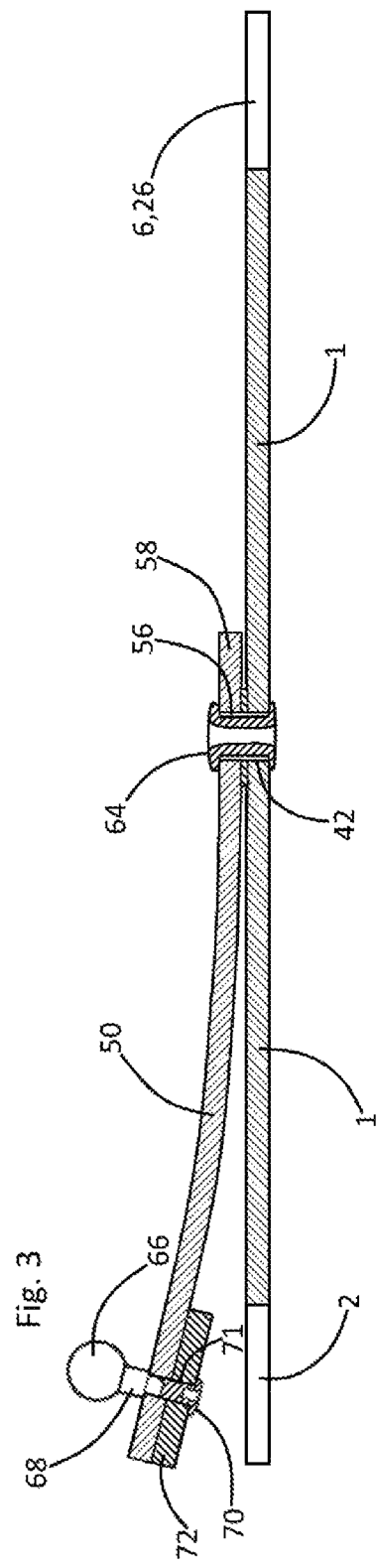

ASSEMBLY FOR COMMUNICATING A STATUS OF A VEHICLE

FIELD OF THE INVENTION

This invention relates to apparatus and assemblies which are adapted for communicating to vehicle operators important information relating to the safety and operability statuses of their vehicles. More particularly, this invention relates to such assemblies which incorporate specialized manually reconfigurable signage.

BACKGROUND OF THE INVENTION

Commercial load carrying vehicles such as trucks and semi-tractor trailer rigs commonly experience "wear and tear" which changes the vehicles' safety, maintenance, and operability status over time. For example, an enclosed 18-wheel semi-trailer may, during a year of cargo hauling use, physically transition between differing road worthiness conditions such as a "ready for on-the-road cargo hauling" status, a "currently due for scheduled maintenance" status, an "urgent repair needed" status, and a "road use prohibited" status. Where a semi-trailer experiences such status changes, casual inspections made by an operator of the trailer often fails to accurately communicate to the operator the trailer's current status. For example, a semi-trailer may have an airbrake line leak rendering the trailer unsuitable for driving upon roadways, and a casual inspection of the trailer by the operator may undesirably fail to communicate the trailer's actual "road use prohibited" status.

The instant inventive assembly for communicating vehicle statuses solves or ameliorates the vehicle status communicating problems and deficiencies discussed above by providing specialized placard and applique structures and assemblies which are attachable to vehicles, and are attachable to usage environments closely associated with the vehicles.

BRIEF SUMMARY OF THE INVENTION

A first structural component of the instant inventive assembly for communicating a status of a vehicle comprises a preferably circular inner plate having a circular peripheral edge. In the preferred embodiment, the inner plate component is composed of durable plastic. Suitably, the inner plate may be alternatively composed of sheet steel or sheet aluminum.

Further structural components of the instant inventive assembly comprises an inner slot plurality. In a preferred embodiment, such slot plurality consists of four slots or a quadruple of slots, such slots being evenly circumferentially spaced at 90° intervals around the periphery of the inner plate. Suitably, the inner slot plurality may alternatively comprise a triple of slots spaced at 120° intervals or may comprise a quintuple of slots spaced at 72° intervals. Each of the inner slots is preferably substantially rectangular and each preferably opens radially outwardly at the peripheral edge of the inner plate.

The preferred even circumferential spacing of the inner plate's peripheral slots advantageously contributes to the formation and definition of a circumferential series of visually distinctive wedge or shield shaped surfaces. In accordance with the instant invention, such shield shaped surfaces may advantageously display various types of vehicle status indicating indicia including letters, numbers, graphic symbols and various coloration schemes.

A further structural component of the instant assembly comprises an outer plate which is preferably circular and has a diameter closely matching the diameter of the inner plate. In the preferred embodiment, the outer plate is rotatably mounted upon the inner plate by means of a centrally located axle fastener, such rotary mount establishing the inner and outer plate combination as a placard assembly.

A further structural component of the instant inventive assembly comprises an outer slot which is positioned at the peripheral edge of the outer plate. In the preferred embodiment, the outer slot is geometrically configured as a wedge shaped window for, upon rotation of the outer plate, successively overlying and exposing the visually distinctive indicia display surfaces of the inner plate.

In addition to lending a unique and visually distinctive appearance to the inner plate's display surfaces, the inner slot components function as pawl engaging recesses. The invention's pawl component is preferably fixedly attached to and extends inwardly from the inner face of the outer plate, the pawl preferably being sized and configured for nesting engagements with the inner slots. In the preferred embodiment, the pawl component comprises rectangular latch plate, and each inner slot is preferably consistently rectangularly configured and sized.

The preferred circular shape of the inner plate, in combination with its evenly circumferentially spaced inner slots advantageously configures each of the plate's indicia display surfaces in a distinctive shield icon shape which features an arcuately curved upper or radially outer edge and rectangular steps or insets at the upper left and upper right corners of the shield icon.

To compliment and work in conjunction with the shield icon imagery of the inner plate's indicia display surfaces, the instant inventive assembly preferably further includes and comprises a plurality of appliques or adhesive stickers which are geometrically shaped in a manner silhouetting the same shield icon which is portrayed by the slot structures of the placard assembly. The applique components of the instant invention may be advantageously posted and displayed at locations which are closely associated with semi-trailers upon which the placard assemblies have been installed. For example, the invention's applique components may be displayed at and around loading docks and platforms, or within truck cabs. Indicia bearing surfaces of the appliques may include express written reminders directing truck operators to refer to and check the invention's truck mounted placard assemblies for accurate trailer status information.

In use of the instant inventive assembly, the circumferential array of indicia display surfaces appearing upon the placard assembly's inner plate may, for example, be four in number (or a quadruple of surfaces) and such surfaces may display indicia adapted to alternatively communicate a first trailer status, a second trailer status, a third trailer status, and a fourth trailer status. As examples, the first status indicia may indicate that the trailer to which the placard is attached is ready for roadway use; the second indicia may indicate that such trailer is in need of scheduled maintenance; the third indicia may indicate that such trailer is in urgent need of repair; and the fourth indicia may indicate that the trailer is not in a condition suitable for driving upon roadways. The placard assembly may be securely fixedly attached to, for example, the rear door of an enclosed semi-trailer. Upon such placard mounting, and an operator may rotate the outer plate until its wedge shaped outer slot aligns with and exposes an indicia display surface which bears indicia which accurately communicates the trailer's status. Upon such overlying rotary alignment of the outer plate, the pawl component advantageously inwardly flexes into a normal engagement within one of the inner plate's inner slots, such engagement securely latching the outer plate at the selected rotary alignment. Where, for example, the outer plate is locked at a rotary position which exposes within the outer slot indicia indicating that urgent trailer maintenance is needed, such indicia remains exposed for reliably communicating that status to a subsequent operator of the trailer.

Operators of the semi-trailer who have become familiar with the structure and function of the placard assembly including its shield icon silhouetting components may readily mnemonically associate the inner placard assembly with the invention's appliques components. Such appliques which preferably silhouette the same shield icon shape formed by the placard components advantageously remind trailer operators to check the invention's placard assembly for its status information prior to operating the trailer. Accordingly, the instant invention advantageously performs functions of communicating crucial trailer status information and assuring such communication.

Accordingly, objects of the instant invention include the provision of an assembly for communicating a status of a vehicle which incorporates structures, as described above, and which arranges those structure, in manners described above, for the performance of the beneficial functions and described above.

Other and further objects, benefits, and advantages of the instant invention will become known to those skilled in the art upon review of the Detailed Description which follows, and upon review of the appended drawings.

BRIEF DESCRIPTION OF THE DRAWINGS

FIG. 2 is a sectional view of the structure of FIG. 1 as indicated in FIG. 1.

FIG. 3 redepicts the structure of FIG. 2, the view of FIG. 3 showing an alternative outwardly splayed or flexed position of an outer plate component.

DETAILED DESCRIPTION OF A PREFERRED EMBODIMENT

Figure 4:
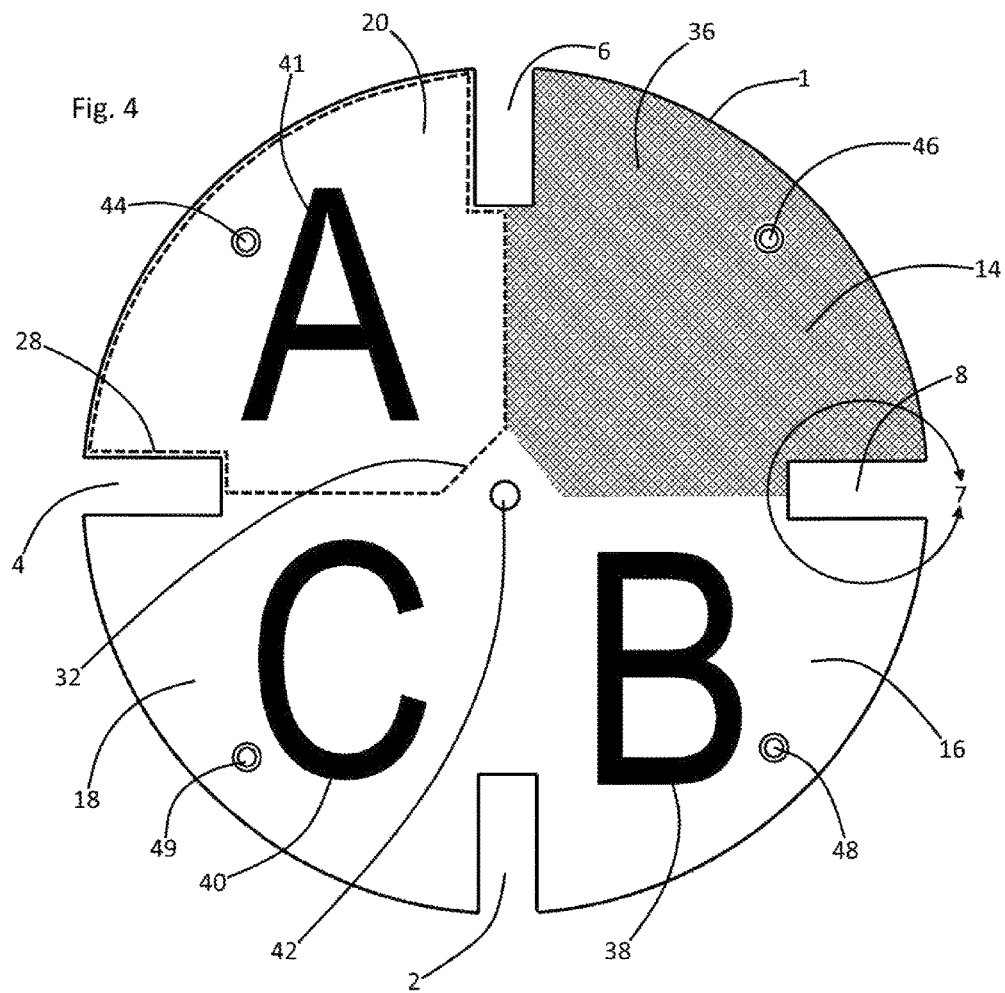
FIG. 4 is a plan view of a disassembled inner plate component of the instant invention.

Referring now to the drawings, and in particular to Drawing FIG. 4, a first structural component of the instant inventive assembly for communicating a status of a vehicle is referred to generally by Reference Numeral 1, such structure comprising a circular inner plate. In the preferred embodiment, the inner plate 1 has a thickness between ⅛" and ¼" and is composed of durable plastic or sheet metal. While the depicted circular configuration of the inner plate 1 is preferred, such shape is intended as being representative of other suitably substituted non-circular inner plate shapes.

A quadruple or four radially outwardly opening slots 2, 4, 6, and 8 are circumferentially arrayed about the peripheral edge of the plate 1. While a provision of four inner plate slots 2, 4, 6, and 8 is preferred, such quadruple of slots is intended as being representative of a provision of a lesser number of evenly spaced slots (such as a triple of slots) and alternatively, as being representative of a provision of a greater number of inner slots (such as a quintuple of slots).

Figure 5:
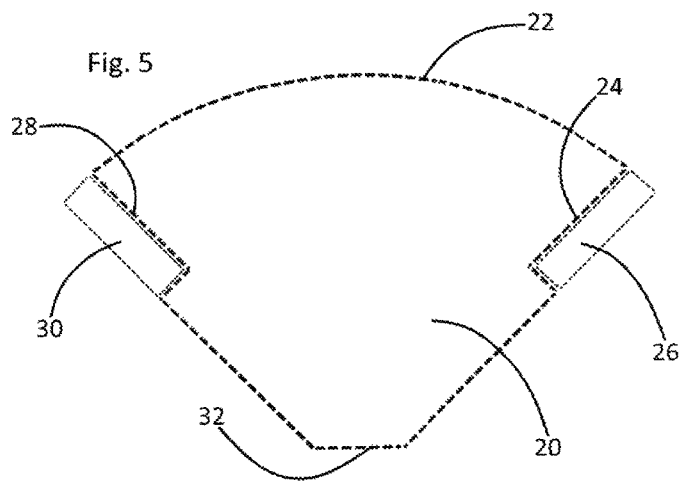
FIG. 5 is a plan view of one of the indicia display surface components of the FIG. 4 structure.
Figure 6:
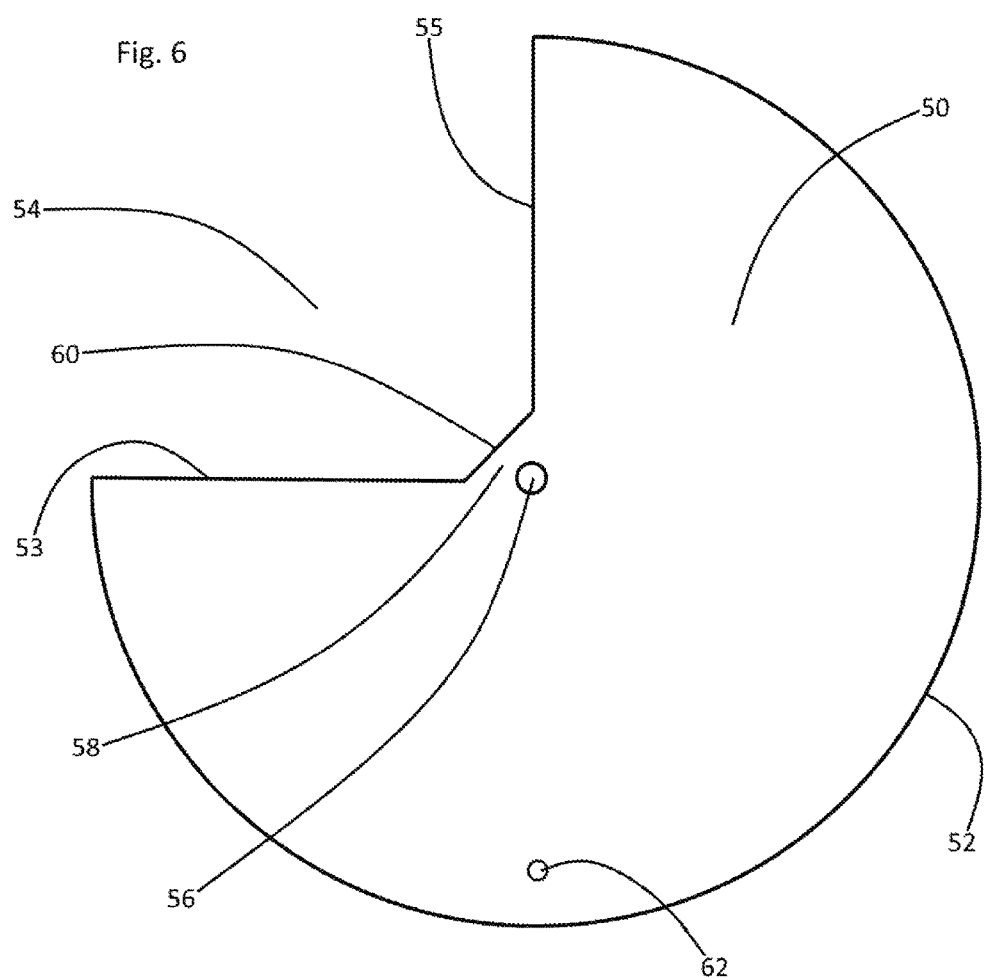
FIG. 6 is a plan view of a disassembled outer plate component of the instant invention.
Figure 7:
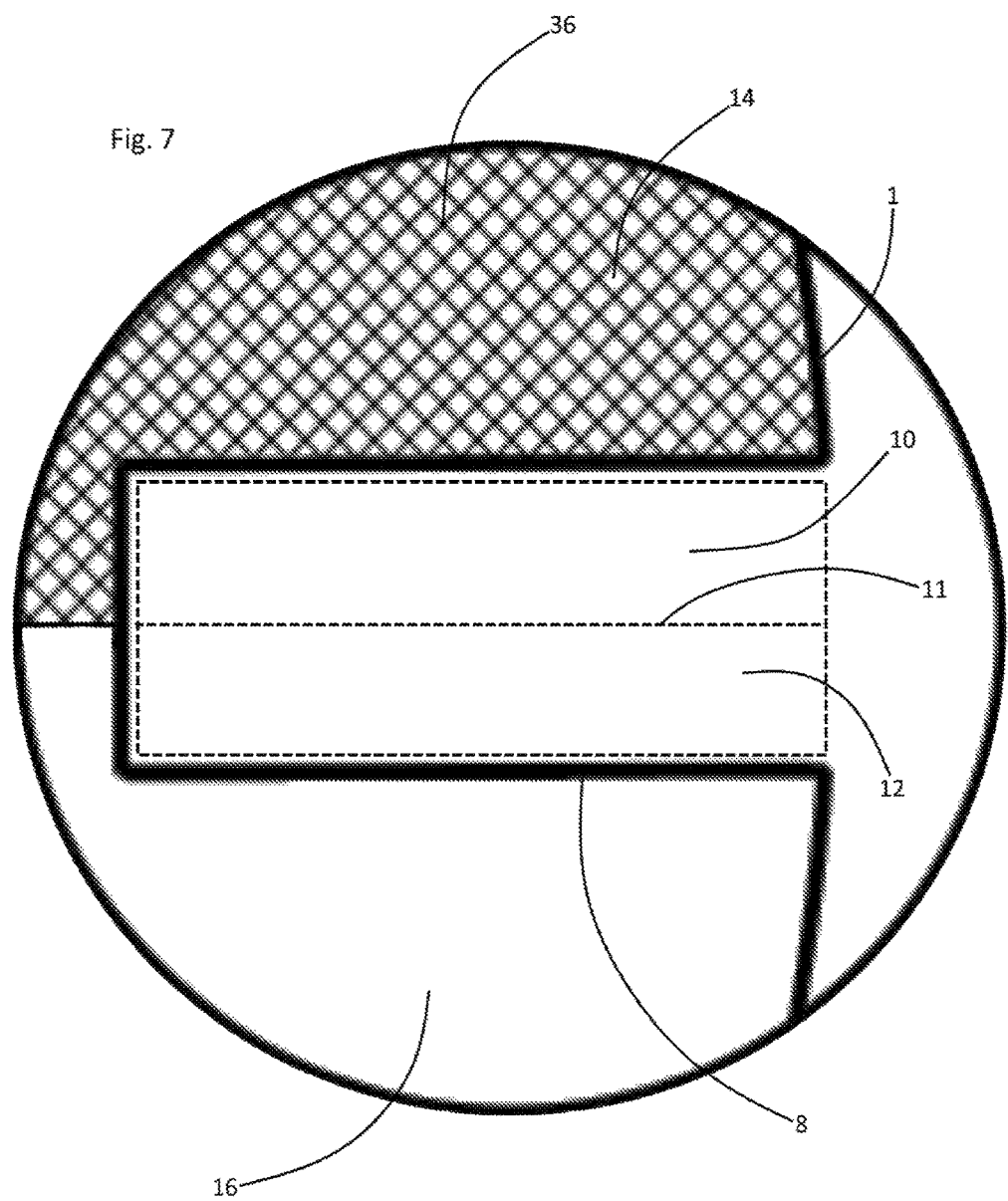
FIG. 7 is a magnified partial view of the structure of FIG. 4, as indicated in FIG. 4.
Figure 8:
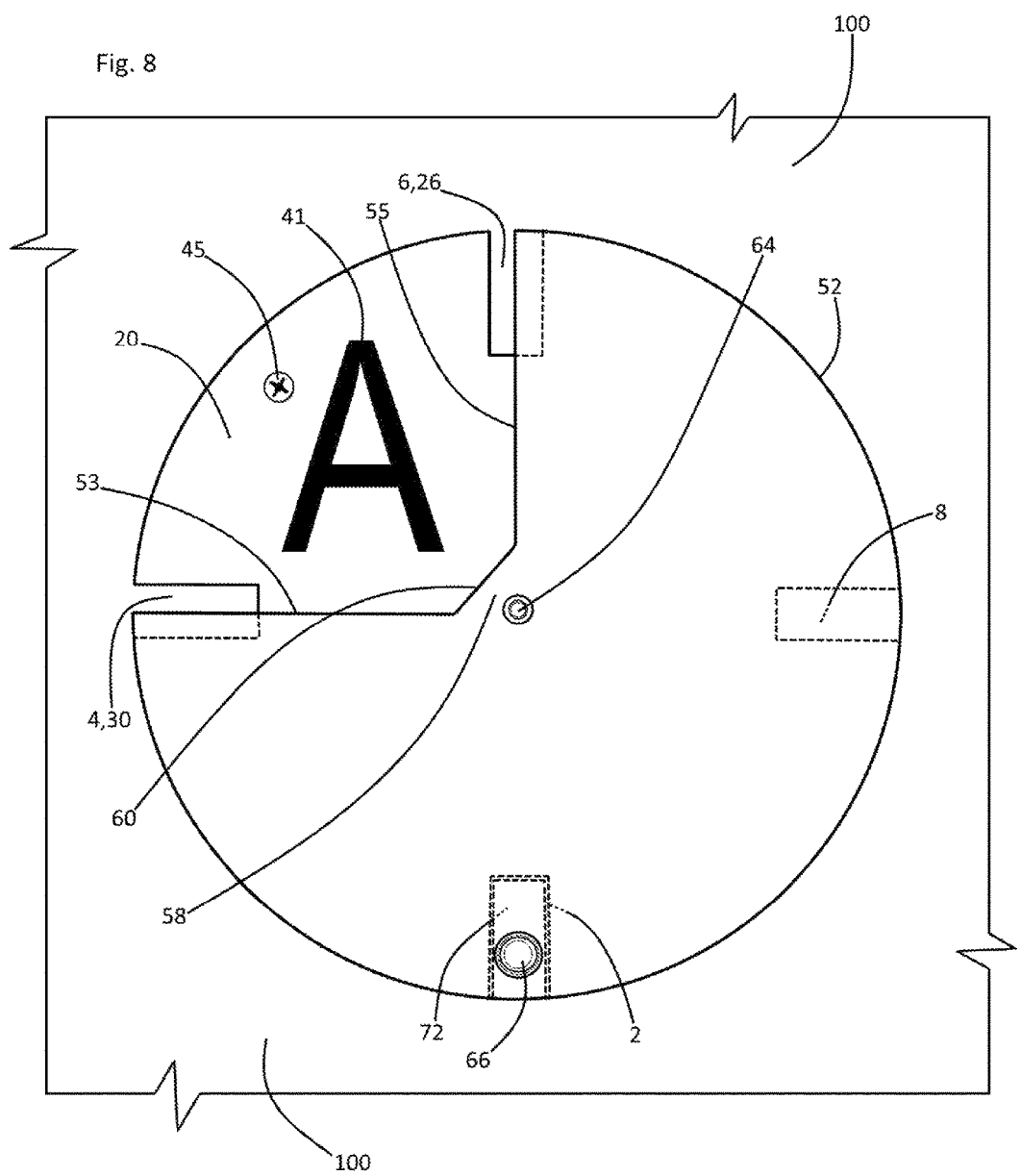
FIG. 8 is a plan view of the structure depicted in FIG. 1.
Figure 9:
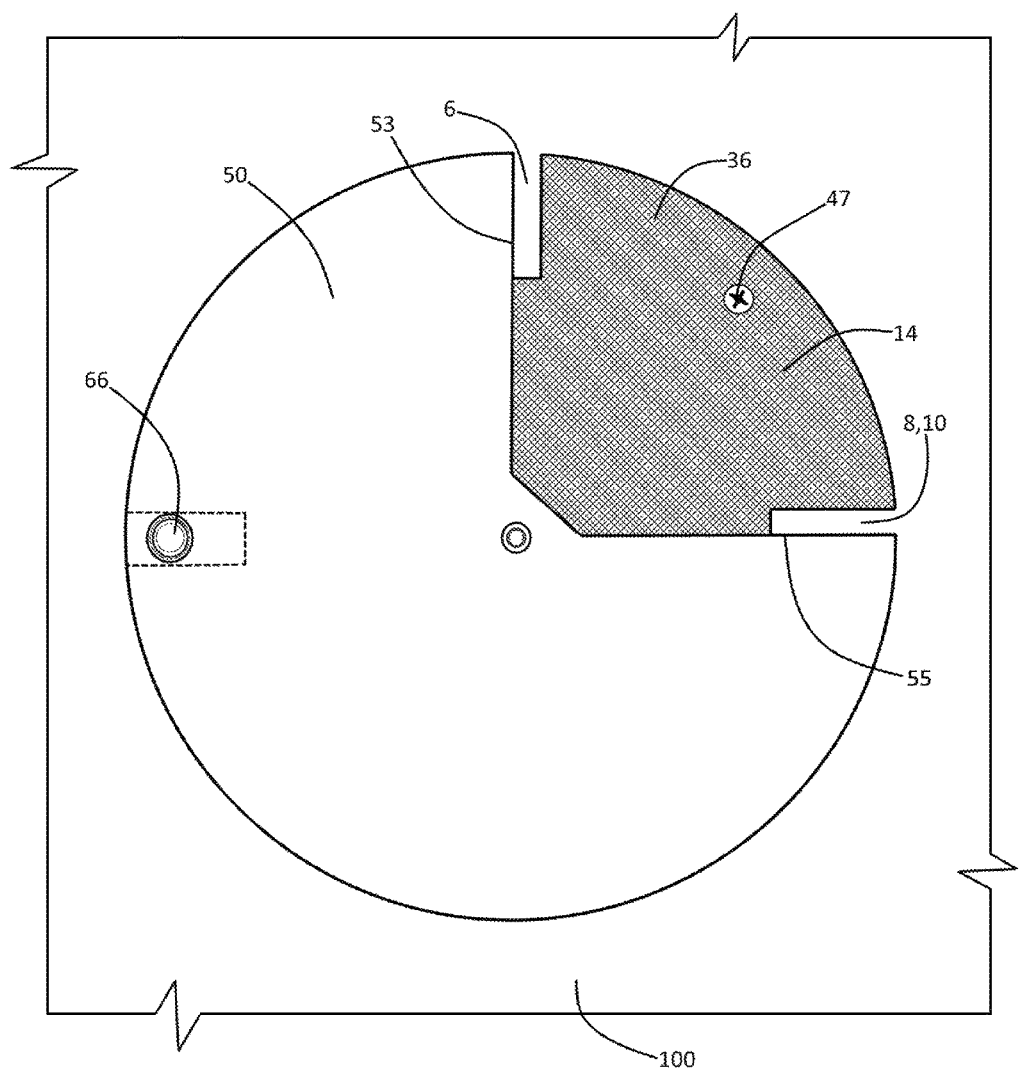
FIG. 9 redepicts the structure of FIG. 8, the view of FIG. 9 showing an outer plate component rotated 90° clockwise.
Figure 10:
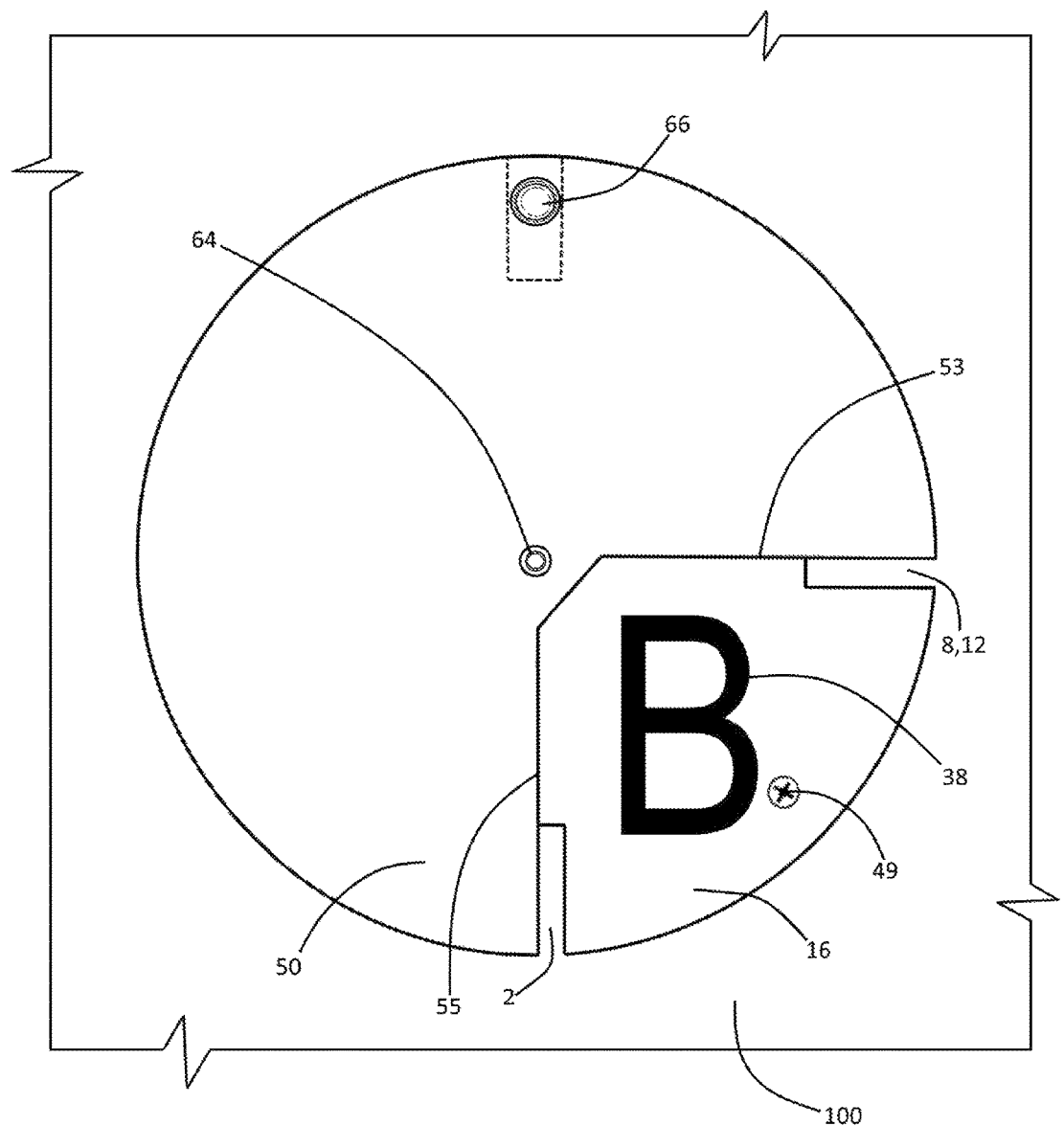
FIG. 10 is a redepiction of the structure depicted in FIGS. 8 and 9, the view of FIG. 10 showing the outer plate component further rotated 90° clockwise.
Figure 11:
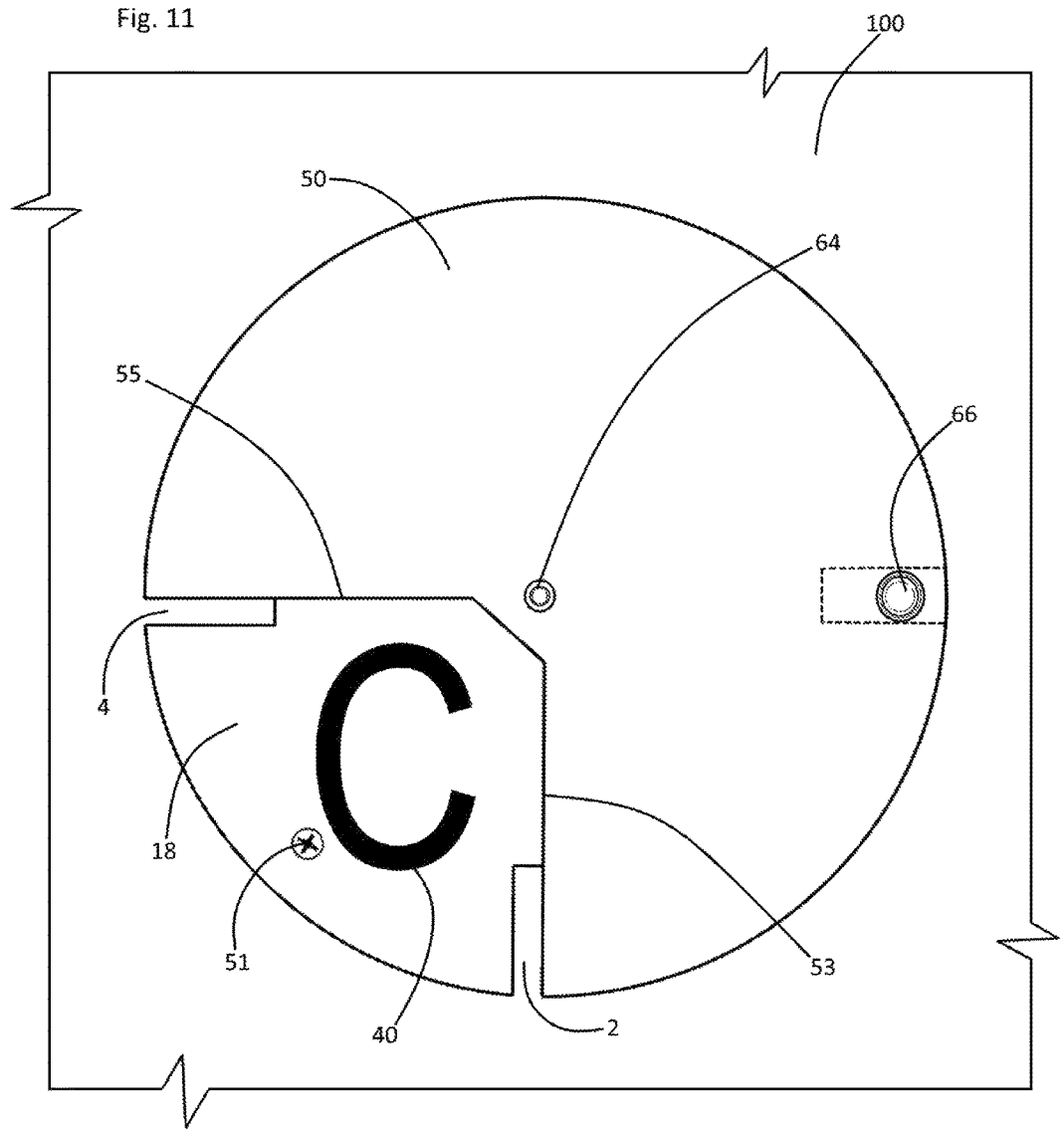
FIG. 11 is a redepiction of the structure depicted in FIGS. 8, 9, and 10, the view of FIG. 11 showing the outer plate component further rotated 90° clockwise.

Referring simultaneously to FIGS. 1-7, each of the radially outwardly opening inner slots 2, 4, 6, and 8 is preferably substantially rectangularly configured and, referring in particular to FIG. 7, each such slot has a counter-clockwise half 10, and a clockwise half 12. The inner plate 1 preferably further has a centrally positioned rotary axle receiving eye 42, and has a plurality of mounting eyes 44, 46, 48, and 49.

Figure 1:
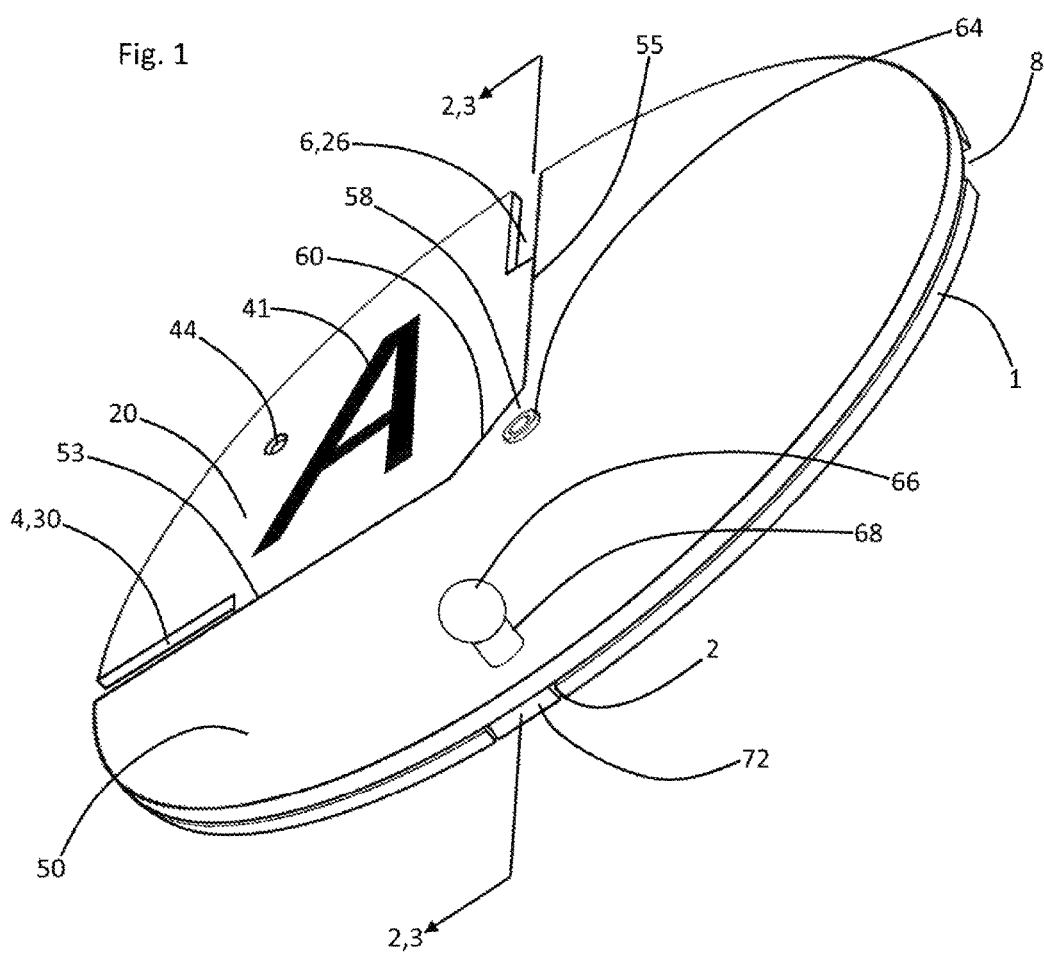
FIG. 1 is a perspective view of an embodiment of the instant inventive assembly for communicating a status of a vehicle.

Referring in particular to FIG. 6, a substantially circularly configured outer plate 50 is provided, such plate having a wedge shaped outer slot 54 which opens radially outwardly at such plate's peripheral edge 52. In the preferred embodiment, counter-clockwise and clockwise edges 53 and 55 of the outer slot 54 are angularly positioned with respect to each other so that, upon stacking and aligning of the plates 1 and 50 to form the placard assembly of FIG. 1, and upon a rotary positioning of either of edges 53 and 55 at an angle which circumferentially bisects one of the inner slots 2, 4, 6, or 8, the other edge of such slot 54 similarly bisects a circumferentially adjacent inner slot. For example, upon a rotary alignment of the counter-clockwise edge 53 to bisect inner slot 4 as indicated in FIG. 1, slot 4's circumferentially adjacent slot 6 is similarly bisected by the clockwise edge 55. Upon a successive 90° clockwise rotation of plate 50 to the angular orientation at which slot edge 53 bisects slot 6, slot edge 55 radially aligns with, referring in particular to FIG. 7, the radially bisecting boundary line 11 between slot 8's counter-clockwise and clockwise halves 10 and 12. The outer plate 50 preferably has a centrally positioned rotary axle receiving eye 56 and, in order to maintain structural integrity of such eye, a reinforcing section 58 preferably radially underlies the radially inner end 60 of slot 54. A handle and pawl mounting eye 62 is preferably positioned near the outer plate's peripheral edge 62 in alignment with a diameter line which includes slot edge 53 or 55.

Upon the rotary mounting of the outer plate 50 upon the inner plate 1 via axle fastener 64 as indicated in FIGS. 1-3, a visually distinctive shield icon shaped indicia display surface 20 is advantageously formed, such shaped surface being bounded by the counter-clockwise and clockwise edges 53 and 55 of the outer slot 54, by the clockwise half 30 of inner slot 4, by the counter-clockwise half 26 of inner slot 6, and by the tangentially extending radially inner floor 60 of the outer slot 54. Such shield shaped surface is separately shown in dashed lines upon FIGS. 4 and 5, and the shield is substantially identically repeated upon each of the other indicia display surfaces 14, 16, and 18. Referring for example to surface 20, each of the placard's indicia display surfaces has an arcuately curved radially outer end or edge 22 which substantially matches and coincides with a portion of the arcuately curved radially outer periphery of plate 1. Such indicia display surfaces also preferably have left and right or counter-clockwise and clockwise insets or steps 28 and 24 which respectively bound, for example, the clockwise half 30 of slot 4, and the counter-clockwise half 26 of slot 20 of slot 6. Finally, the distinctive shield shapes of the inner plate's indicia display surfaces are further formed and defined by the radially inner floor 60 of the outer slot 54. To complete the invention's placard assembly representations of the distinctive shield icon shape, the rotating floor 60 of outer slot 54 successively circumferentially aligns with the tangentially extending radially inner ends of the inner plate's indicia display surfaces.

Upon successive 90° rotations of the outer plate 50, the radially outer slot 54 may similarly align with and expose indicia display surfaces 14, 16, or 18, each of such exposures forming a distinctive shield icon shape which is substantially identical to the shield 20 of FIG. 5. Letter indicia 41, 38, and 40 and/or color indicia 36 appearing upon indicia display surfaces 20, 16, 18, and 14 are intended as being representative of various symbol based, image based, and color based indicia which may be applied for communicating vehicle status information to a vehicle operator.

To assist in manipulation of the outer plate 50, a pull handle 66 is preferably provided, such handle having a stem 68 which extends inwardly through a handle mounting eye 62. The handle stem 68 preferably further extends inwardly through a mounting eye 71 within a rectangular latch pawl or plate 72. The extreme inner end of stem 68 is preferably compressively deformed in the manner of a rivet fastener to include a flare 70 which secures the pawl 72 at the radially outer end of plate 50. The mounting point of the pawl 72 is preferably diametrically opposite the radially outer end of slot wall 55 (or alternatively diametrically opposite slot wall 53) so that, upon a bisecting alignment of either of such slot walls with any one of the inner slots 2, 4, 6, and 8, the pawl 72 will align with, overlie, and normally flexibly inwardly extend into another one of such slots.

To facilitate alternate inward and outward engagements and disengagements of pawl 72, the portion of the outer plate 50 which lies between axle eye 56 and pawl 72 is preferably adapted to function as an elastic spring arm. For example, fabrication of the outer plate 50 from a sheet of durable semi-rigid plastic assures that, upon application of an outward pulling force to handle 66, the plate 50 may elastically flex from the normally latched rotation resisting configuration of FIG. 2 to the disengaged FIG. 3 configuration. Upon rotation of the outwardly flexed outer plate 50 to align pawl 72 with another slot among inner slots 2, 4, 6, and 8, and upon a subsequent release of handle 66, the outer plate's spring arm character advantageously elastically inwardly drives the pawl 72 into nesting and latching engagement with the newly selected underlying inner slot.

The above described orientations of the slots 2, 4, 6, and 8 upon the inner plate 1 in combination with the above described orientation of the pawl 72 upon the outer plate 50 assures that, upon any rotary alignment and nesting engagement of pawl 72 with any one of the slots 2, 4, 6, and 8, one of the indicia display surfaces 14, 16, 18, or 20 will be exposed to view within slot 54. The outer slot 54 simultaneously functions in combination with the inner plate 1 to form and define the invention's visually distinctive shield icon shape.

Referring simultaneously to FIGS. 4, and 8-11, mounting screws 45, 47, 49, and 51 may respectively pass through screw eyes 44, 46, 48, and 49, and may securely mount the placard assembly of the instant invention upon, for example, a rear door 100 of a semi-trailer.

Referring to FIGS. 12-15, additional preferably provided components of the instant inventive assembly are referred to generally by Reference Arrows 73 and 73A, such components comprising shield icon silhouetting appliques. Applique 73 preferably has an arcuately curved radially outer edge 75 which substantially matches and visually suggests the curved radially outer portions of plate 1 which reside between inner slots 2, 4, 6, and 8. The shield icon applique 73 preferably further includes clockwise and counter-clockwise voids 76 and 80 which are bounded by clockwise and counter-clockwise inset edges or steps 74 and 78, such voids and steps preferably substantially matching and visually suggesting the similarly configured voids and steps which reside at the radially outer ends of the clockwise and counter-clockwise edges of the inner plate's indicia display surfaces 14, 16, 18, and 20. Finally, the shield icon configured applique 73 has a tangentially extending radially inner end 82 which suggests the positions and shapes of both the floor 60 of the outer plate's slot 54 and the radially inner ends of each of the display surfaces 14, 16, 18, and 20.

Figure 12:
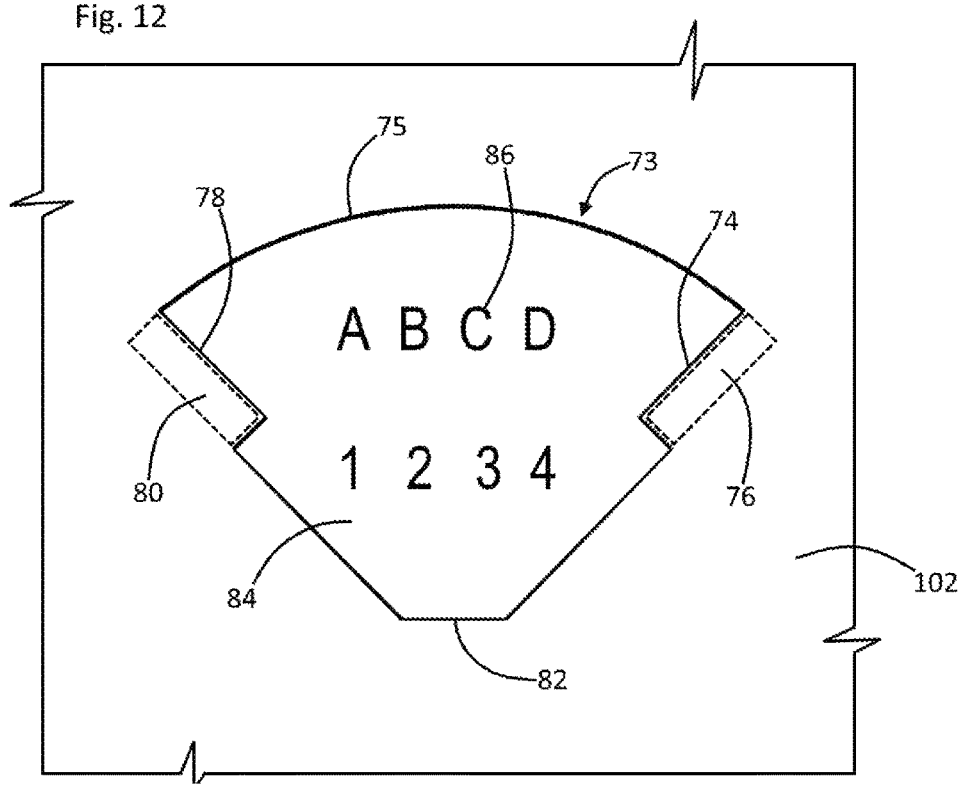
FIG. 12 is a plan view of an applique component of the instant invention.
Figure 13:
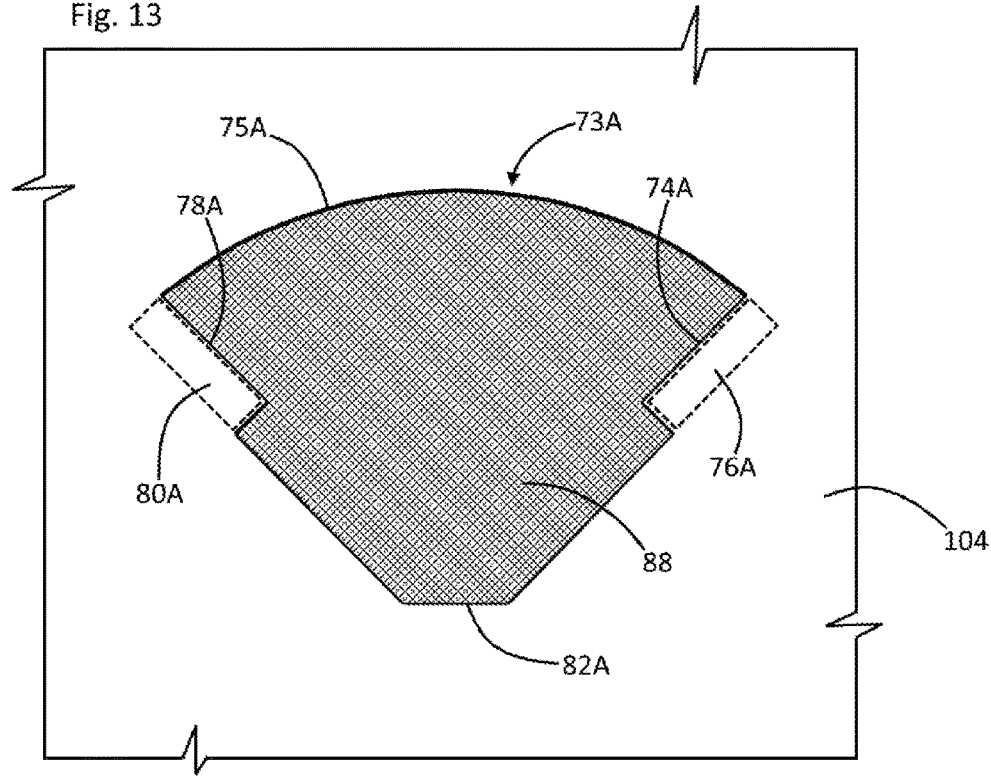
FIG. 13 is a plan view of another applique component of the instant invention.
Figure 14:
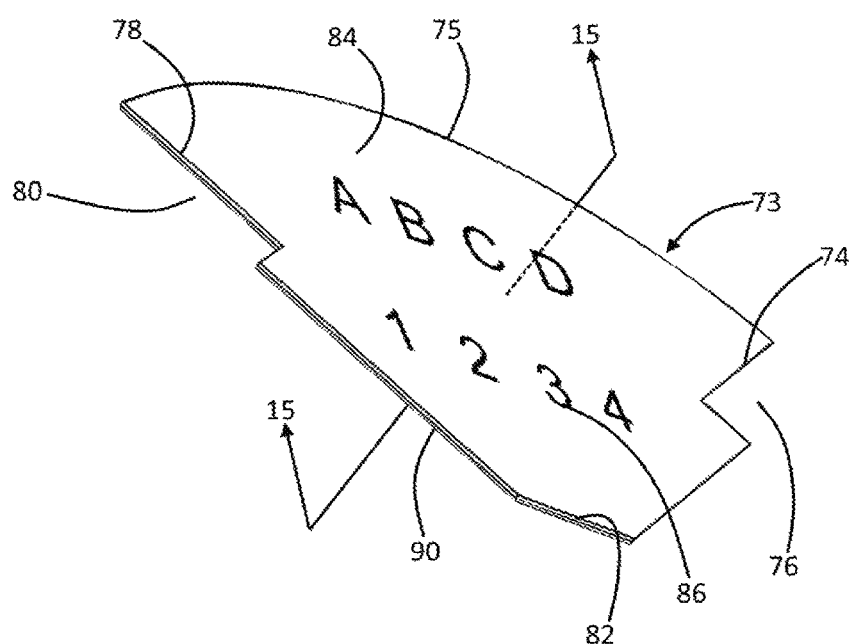
FIG. 14 is perspective view of the structure depicted in FIG. 12.
Figure 15:
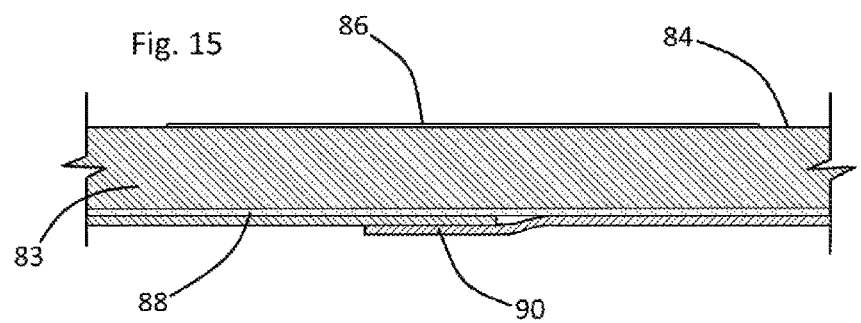
FIG. 15 is a partial sectional view of the structure depicted in FIG. 14, as indicated in FIG. 14.

Each structure identified in FIG. 13 by a reference numeral having the suffix "A" is preferably configured substantially identically to similarly numbered structures appearing in FIG. 12, and the shield icon appliques 73 and 73A are considered as being representative of a provision of a plurality of substantially identically configured shield icon appliques. The shield icon appliques 73,73A preferably have flexible vinyl plastic substrates 83 which underlie display surfaces 84. Each applique preferably has an inner disposition of adhesive 88 and a peel away backing 90. Symbol indicia 86 in the form of letters or numbers, or color indicia 88 may be advantageously placed upon the outer indicia display surfaces 84 of the shield icon appliques 73,7A, such surfaces 84 constituting the invention's second plurality of indicia display surfaces.

In operation of the instant invention, the boundary edges of the radially outwardly opening inner slots 2, 4, 6, and 8, in combination with the boundary edges 53, 55, and 60 of the outer slot 54 perform multiple functions of defining and ascribing a unique, easily recognized, and easily remembered shape to each surface among the invention's first plurality of the indicia display surfaces 14, 16, 18, and 20, while mechanically functioning for rotary movement and for releasably latching pawl 72.

The visually distinctive character of the placard assembly's shield icon forming slot edges is closely reflected and matched by edge features of the invention's shield appliques 73,73A. Vehicle operators who view and manipulate the invention's placard assembly naturally become cognizant of such assembly's latch pawl, slot, and rotary axle features, and such operators naturally become cognizant of the distinctive shield shape which those mechanical features combine to form at a front view of the placard. Such operator cognizance advantageously mnemonically corresponds with the matching shield icon silhouettes of the invention's applique components. The invention's intended mnemonic correspondence between the placard and applique components advantageously produces within a vehicle operator a mental association directed to the invention's vehicle status communicating plates.

Operators of the instant inventive assembly may preliminarily adhesively apply several renditions of the invention's shield icon appliques 73,73A at various locations, such as a truck cab wall 102, or a loading platform, warehouse, or loading dock wall 104. Text based indicia 86 may include language directing a truck driver to remember to check the placard which has been mounted, for example, onto the rear door 100 of the truck driver's semi-trailer. The distinctive shield icon shape of the applique compliments and reinforces such written reminders. Accordingly, the instant inventive assembly multiply functions for accurately communicating to vehicle operators the status of a vehicle and for reminding such operators to check the invention's placard assembly for important vehicle status information.

While the principles of the invention have been made clear in the above illustrative embodiment, those skilled in the art may make modifications to the structure, arrangement, portions and components of the invention without departing from those principles. Accordingly, it is intended that the description and drawings be interpreted as illustrative and not in the limiting sense, and that the invention be given a scope commensurate with the appended claims.

The invention hereby claimed is:

1. An assembly for communicating a status of a vehicle, said assembly comprising:
    (a) an inner plate having a peripheral edge;
    (b) an inner slot plurality selected from the group consisting of triples of slots, quadruples of slots, and quintuples of slots, each slot among the selected inner slot plurality being positioned at the inner plate's peripheral edge;
    (c) a first plurality of indicia display surfaces, each indicia display surface having a radially inner end, and each indicia display surface being positioned between a circumferentially adjacent pair of slots among the selected inner slot plurality;
    (d) an outer plate having a peripheral edge, the outer plate being rotatably mounted upon the inner plate;
    (e) an outer slot positioned at the outer plate's peripheral edge, the outer slot being sized for, upon rotation of the outer plate, successively exposing surfaces among the first plurality of indicia display surfaces; and
    (f) a pawl fixedly attached to and extending inwardly from the outer plate, the pawl being positioned for, upon the outer plate rotation, successively engaging slots among the selected inner slot plurality.

2. The assembly of claim 1 wherein the inner and outer plates are circular and have diameters substantially equal to each other.

3. The assembly of claim 1 wherein each inner slot opens radially outwardly.

4. The assembly of claim 3 wherein each inner slot comprises a clockwise inner slot half and a counter-clockwise inner slot half.

5. The assembly of claim 4 further comprising a first plurality of clockwise voids and a first plurality of counter-clockwise voids, wherein each indicia display surface among the first plurality of indicia display surfaces comprises one of the clockwise voids, wherein said each indicia display surface further comprises one of the counter-clockwise voids, wherein said each indicia display surface's clockwise and counter-clockwise voids respectively comprise the clockwise half of one of the inner slots and the counter-clockwise half of another inner slot, said another inner slot being circumferentially adjacent to said one of the inner slots.

6. The assembly of claim 5 wherein the outer slot has a radially inner floor.

7. The assembly of claim 6 wherein each indicia display surface among the first plurality of indicia display surfaces has a radially inner end, said each surface's radially inner end being positioned for, upon a rotation of the outer plate to expose said each surface, alignment of the outer slot's radially inner floor with said each surface's radially inner end.

8. The assembly of claim 5 further comprising a second plurality of indicia display surfaces, a second plurality of clockwise voids, a second plurality of counter-clockwise voids, and a plurality of appliques, each applique having a front, an arcuate radially outer edge having clockwise and counter-clockwise ends, and having a radially inner edge, wherein each indicia display surface among the second plurality of indicia display surfaces comprises the front of one of the appliques, wherein one of the voids among the second plurality of clockwise voids is positioned at the clockwise end of said one applique's arcuate radially outer end, and wherein one of the voids among the second plurality of counter-clockwise voids is positioned at the counter-clockwise end of said one applique's arcuate radially outer end.

9. The assembly of claim 8 wherein each of the appliques' indicia display surfaces has a tangentially extending radially inner end.

10. The assembly of claim 4 wherein the pawl is substantially rectangular, and wherein each inner slot is fitted for nestingly receiving the pawl.

11. The assembly of claim 10 further comprising a handle fixedly attached to and extending outwardly from the outer plate.

12. The assembly of claim 11 wherein the handle is positioned for, upon a nesting engagement of the pawl with one of the inner slots, and upon an outward pull against the handle, outwardly flexing the outer plate and outwardly disengaging the pawl.

13. The assembly of claim 12 wherein the outer plate is adapted for, upon the outward disengagement of the pawl, and upon a rotation of the outer plate to align the pawl with another inner slot, inwardly engaging the pawl with said another inner slot.

* * * * *